July 1, 1952    G. L. LUPFER ET AL    2,602,044
CLAY DECOLORIZING OF SOLVENT REFINED LUBRICATING OILS
Filed April 7, 1948
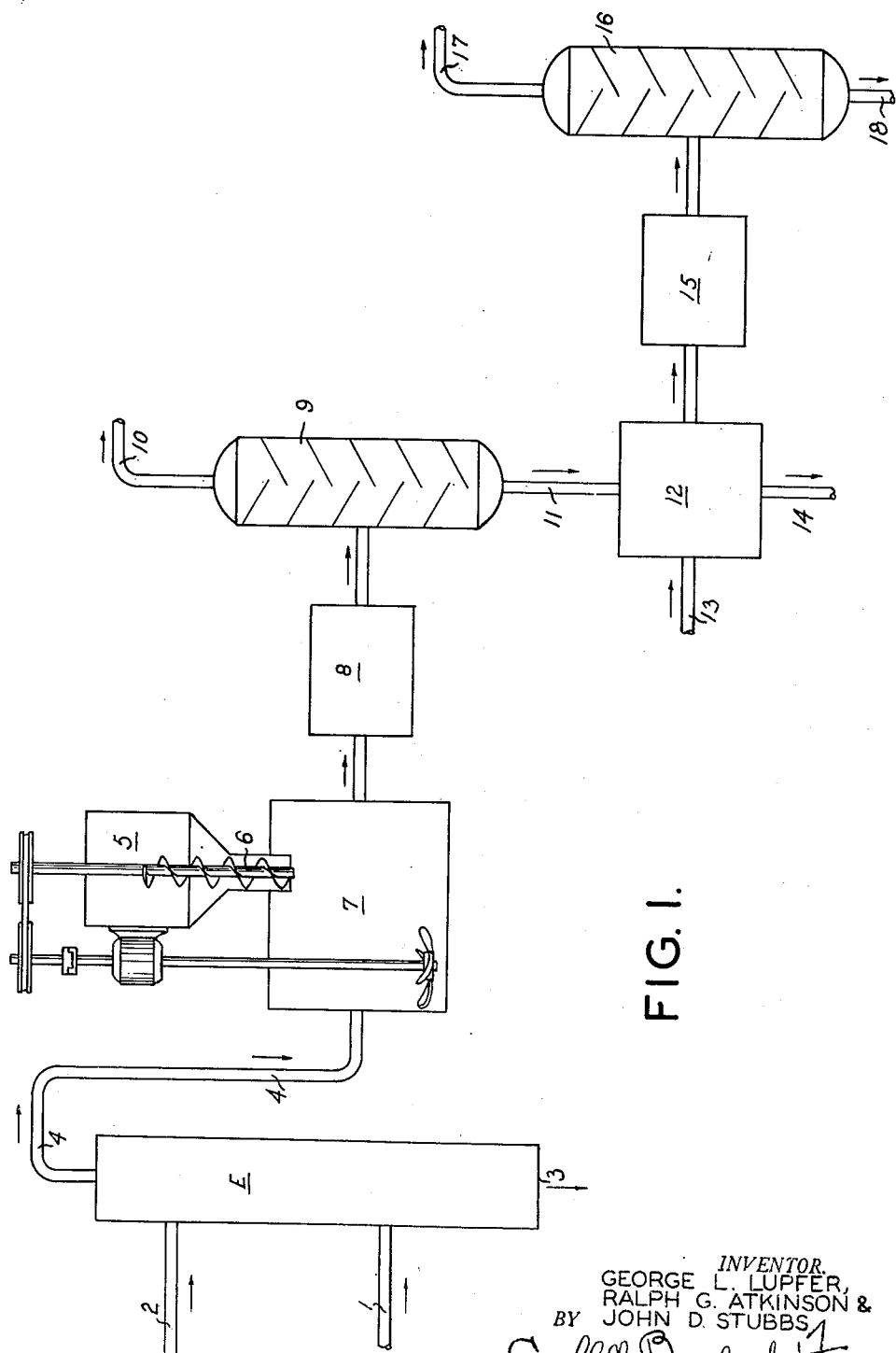
FIG. I.
INVENTOR.
GEORGE L. LUPFER,
RALPH G. ATKINSON &
BY JOHN D. STUBBS
Their ATTORNEYS.

Patented July 1, 1952

2,602,044

UNITED STATES PATENT OFFICE 2,602,044

CLAY DECOLORIZING OF SOLVENT REFINED LUBRICATING OILS

George L. Lupfer, Bedford, Ralph G. Atkinson, Maple Heights, and John D. Stubbs, Cleveland, Ohio, assignors to The Standard Oil Company, Cleveland, Ohio, a corporation of Ohio Application April 7, 1948, Serial No. 19,584

1 Claim. (Cl. 196—14.15)

This invention relates to the refining of lubricating oil stocks and more particularly to a combination thereof, with the decolorizing of said oil stocks. The invention provides a method of using decolorizing clay in combination with a solvent treatment of lubricating oil stocks in which better and more efficient results are obtained.

The conventional method of decolorizing mineral oils involves passing the refined oil through stationary beds of some type of decolorizing earth or clay or mixing the clay with oil and then filtering. This operation is carried out generally as a separate step at the end of the refining process and quite independent thereof.

An objectionable feature of the conventional system of clay decolorization is that since the clay acts more efficiently on oil at a fairly high temperature, it is usually necessary to provide heat exchangers and other means of raising the temperature of the refined mineral oil at the time it is clay treated. The requirement for heat may be a considerable part of the cost of the decolorizing step.

These disadvantages of the prior art are overcome in accordance with the invention by the addition of a solvent to a lubricating oil stock or constituent such as mineral oil, wax and impurities or mixtures thereof, removing an impurity or unwanted component, passing the mixture of oil stock and solvent to a mixing tank where decolorizing clay or earth of an appropriate type is added. The resultant slurry is then heated and the solvent is distilled off. The temperature necessary to distill the solvent is sufficient to effect good decolorization with a minimum amount of clay. The slurry now consists of an oil stock and clay and is pumped to another vessel at which point a second solvent is added. The effect of the second solvent is to cause the removal of another impurity or unwanted component. This leaves a slurry consisting of purified decolorized oil and solvent in one phase and decolorizing clay and second impurity in other phases. It will be understood that the term "impurity" is used broadly to refer to substances that are undesirable in lubricating oils and that said impurities may be, as in the case of wax, valuable by-products of the process. The clay and other solids are then removed by an appropriate method such as filtration and the liquid solvent-oil stock mixture passed to another column where the solvent is distilled off. The clay may then be recovered by filtration, distillation or any appropriate means if the impurity is to be recovered.

The fact that the decolorizing clay is mixed with the oil while diluted with a solvent and while distillation is being performed on it, assumes a degree of contact between the clay and oil that results in better decolorization. The high temperature at which these operations are carried out increases the degree of decolorization produced by a given amount of clay and since the slurry must be heated for the distillation, the separate heating of the oil during conventional decolorization is eliminated. In this way no additional heat is required and the heat serves two functions: to accomplish the distillation and to decolorize at the same time.

The presence of the clay in admixture with the first solvent does not interfere with the solvent removal, and the presence of the clay in admixture with the second solvent does not adversely affect the removal of the second impurity.

The process of the invention also has the advantage of avoiding any separate clay removal step after the decolorization, a step which is necessary in the prior art after clay treatment, because the clay is separated simultaneously with the second impurity and by the same step necessary for separating the second impurity.

The invention will be illustrated by the following examples in which reference will be made to the accompanying diagrammatic drawing:

Example 1

A clean lubricating oil feed stock containing wax and undesirable aromatic components is fed into extraction tower E through pipe 1. The stock may be any clean feed stock such as that produced by distillation, deasphalting or other suitable means. Furfural is fed through pipe 2 and may be present in a ratio of solvent to feed stock of from 1:1 to 10:1 depending upon the degree of refining desired. The extracted material removed from the oil charge is largely aromatic in character and some leaves the extractor at 3 usually with some solvent and passes to a separate solvent recovery system. This step is conventional in the art and any of the known solvent extraction procedures may be used, it may be a batch or continuous process. The raffinate and the dissolved furfural leaves the extractor section at 4 and enters the mixing tank 7. Decolorizing clay or earth is added to the mixing tank from a bin 5 through automatic clay feeder 6. The amount of clay used may be from .5 to 90 pounds per barrel of solvent-free oil. The clay is maintained in a state of suspension in this tank by means of a mixer as shown.

The slurry of raffinate, furfural, and clay is then pumped through a heat exchanger or oil heater 8 into the raffinate stripper tower 9. The temperature of the stream entering the raffinate stripper will be from 400° F. to 550° F. depending upon the type of stock being processed and the pressure. The raffinate stripper in this particular case is operated at a pressure of 0 to 4 pounds per square inch gauge pressure. The furfural is separated by steam stripping and leaves the tower at 10. Part of the recovered furfural may be returned to the tower as reflux, and heat may be applied at the bottom of the tower by any means known in the art.

Under the temperature conditions existing in the stripping tower the oil is decolorized by the action of the clay. The resultant slurry of decolorized oil stock and clay leaves the tower at 11 and passes to a solvent dewaxing unit 12. The slurry is adjusted in temperature usually through a heat exchanger to heat the charge to the tower. A solvent mixture of methyl-ethyl-ketone, benzol and toluol is added at 13. This dewaxing solvent may be added in a ratio of solvent to oil of from 1:1 to 30:1. The solvent may vary in composition from 10 to 90 volume percent methyl-ethyl-ketone, from 0 to 80 volume percent benzol and from 0 to 80 volume percent toluol. Within unit 12, the oil, solvent, clay slurry is cooled by any appropriate means such as by ammonia in a double pipe direct expansion system. Under the temperature conditions selected and with the amount of methyl-ethyl-ketone employed the wax in the stock is largely insoluble. The chilled mixture containing the precipitated wax goes to a filter within unit 12 where the clay and wax are separated from the decolorized oil. This mixture of solids leaves the dewaxing unit at 14, from which the clay, the decolorized wax and the entrained solvent may be separated and reclaimed by any means convenient.

The oil is pumped through heat exchanger 15 to a methyl-ethyl-ketone solvent recovery system 16, the recovered methyl-ethyl-ketone solvent leaves at 17 and the refined, dewaxed and decolorized oil product leaves at 18.

In this example other refining and dewaxing solvents may be used in a similar sequence.

Example 2

Referring to the same diagram that illustrated Example 1, an oil stock containing an undesirable asphaltic impurity is mixed with liquid propane in a propane oil ratio varying from 1:1 to 30:1. In the extractor E, the asphaltic material separates out and is removed at 3. The deasphalted oil and solvent now pass through pipe 4 to mixing tank 7 where clay is added as in Example 1. The amount may vary from 1 to 150 pounds of clay per barrel of deasphalted oil. After passing through suitable heat exchangers at 8, the slurry is pumped to a flash drum 9 which the propane leaves at 10. In practice the unit at 9 may comprise a high pressure flash drum and a steam stripping tower to remove the final traces of propane. The temperatures reached and maintained during this solvent recovery operation will normally be between 200° F. and 600° F. At this temperature the oil stock is decolorized simultaneously with the removal of the deasphalting solvent.

The slurry, now consisting of the deasphalted and decolorized oil stock and clay, passes through pipe 11 to solvent extraction unit 12 to which furfural is added at 13 in the ratio of from 1:1 to 10:1 depending on the degree of refining desired. The clay is contained in the extract phase which leaves the extraction unit at 14 whence it passes to suitable equipment for the recovery of the solvent, and if desired the separation of the extract from the clay. The oil, now decolorized and free of asphaltic and aromatic material, passes through a suitable heat exchanger 15 to solvent recovery system 16 with the recovered furfural leaving at 17 and the product at 18. If desired the clay may be separated with the product at 18 instead of at 14, and then filtered.

Example 3

The general operation of the process is the same as that described in the previous examples. The first solvent added is furfural and the first impurity removed is an aromatic-containing extract. The second solvent is propane and the second impurity is asphalt. The product is a deasphalted, extracted and decolorized oil. If this oil be subsequently dewaxed, the wax will be of an improved color.

Example 4

The first solvent added is propane and the first impurity removed, asphalt. The second solvent is methyl-ethyl-ketone and the second impurity a wax of improved color. The product is a deasphalted, dewaxed and decolorized oil.

Example 5

The first solvent is methyl-ethyl-ketone and the first impurity removed, wax. Appropriate changes in the apparatus may be made so that the wax may be removed at 3. The second solvent is furfural and the second impurity is aromatic-containing extract. The product is a dewaxed, extracted and decolorized oil.

It should be understood that the above examples merely illustrate the applications of the inventions and are not intended to limit it as to solvents to be employed or impurities to be removed. It will also be understood that changes in operating conditions necessitated by the use of other solvents may be made without departing from the spirit of the invention. The arrangement of heat exchangers and other auxiliary equipment may also be changed to suit particular operating conditions without departing from the spirit of the invention. The scope of the invention is not limited by the type of decolorizing earth or clay employed as the process is applicable to any granular decolorizing substance.

We claim:

A process for refining a mineral oil stock which comprises adding furfural to said mineral oil stock, separating the extract, adding a decolorizing clay to the mixture of refined oil stock and furfural, heating the resultant slurry of refined oil stock, furfural and clay to a temperature to distill off the furfural and improve the color of the oil stock, adding methyl-ethyl-ketone to the slurry of refined oil stock and clay, chilling the slurry to precipitate wax from the oil, separating said clay and the precipitated wax from said oil and said methyl-ethyl-ketone, and subsequently separating said methyl-ethyl-ketone to produce a refined, dewaxed and decolorized oil.

GEORGE L. LUPFER.
RALPH G. ATKINSON.
JOHN D. STUBBS.

REFERENCES CITED

The following references are of record in the file of this patent:

UNITED STATES PATENTS

| Number | Name | Date |
|---|---|---|
| 1,509,326 | Weir | Sept. 23, 1924 |
| 2,145,784 | Anderson et al. | Jan. 31, 1939 |
| 2,165,638 | Manley | July 11, 1939 |
| 2,279,937 | Brown | Apr. 14, 1942 |